July 4, 1972    B. BAUMANN    3,674,605
PROCESS FOR THE ASSEMBLY OF SHEETS AND APPARATUS FOR SAME
Original Filed March 10, 1969    6 Sheets-Sheet 6
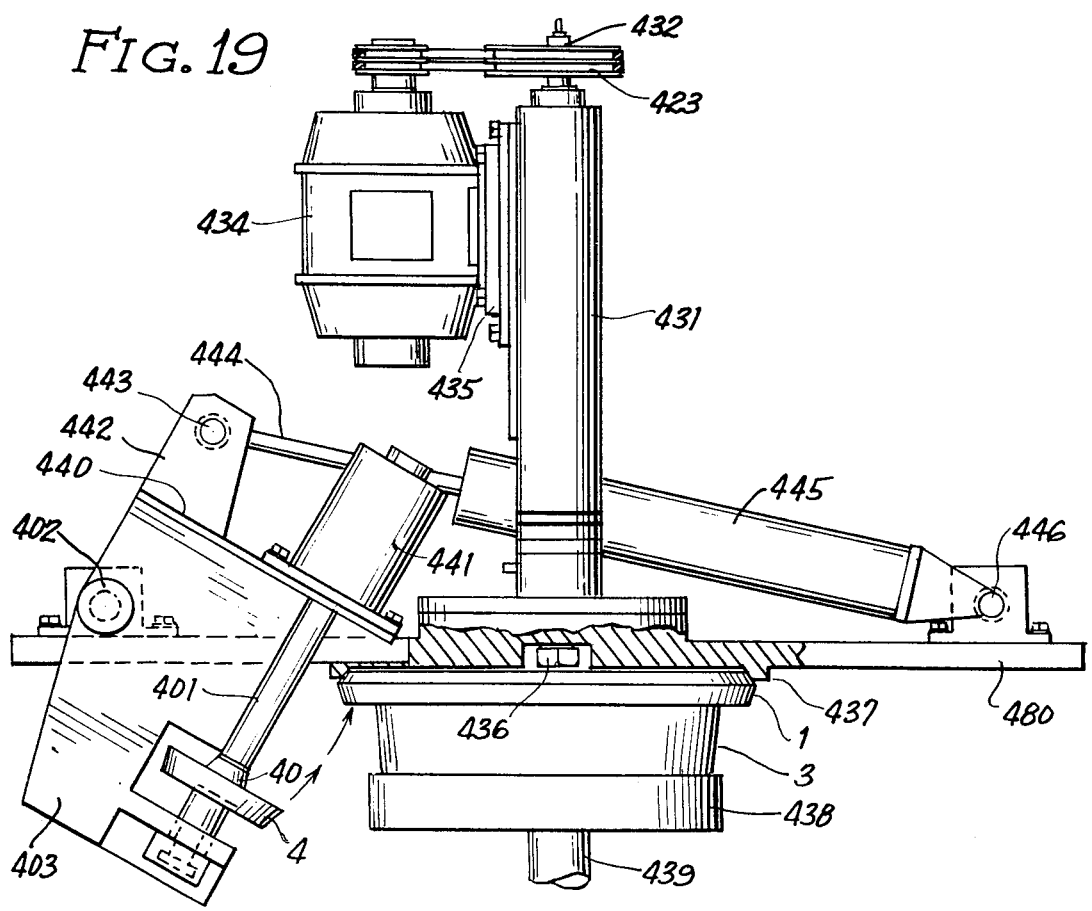
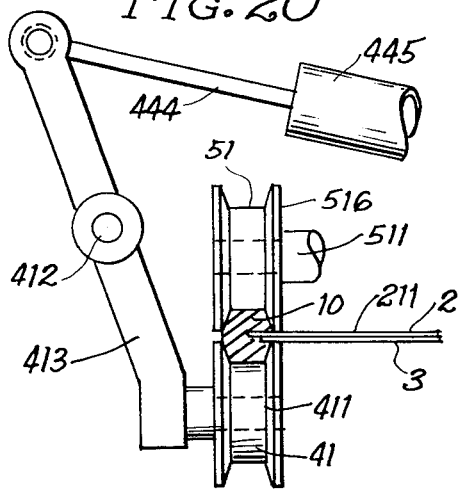
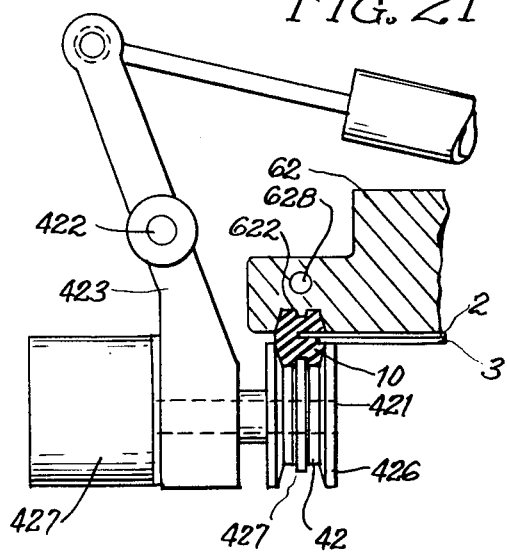

United States Patent Office 3,674,605
Patented July 4, 1972

3,674,605
PROCESS FOR THE ASSEMBLY OF SHEETS
AND APPARATUS FOR SAME
Bernard Baumann, Paris, France, assignor to
L'Aluminium Francais
Application Mar. 10, 1969, Ser. No. 816,143, which is a continuation-in-part of application Ser. No. 503,842, Oct. 23, 1965. Divided and this application Nov. 28, 1969, Ser. No. 882,378
Int. Cl. B32b 3/04
U.S. Cl. 156—479
10 Claims

ABSTRACT OF THE DISCLOSURE

A system for joining flat portions of sheets with a joint blank formed of thermoplastic material. The joint blank initially defines first and second flat sides extending substantially perpendicularly one from the other. One flat side is disposed in overlying relationship with the flat edge portions of the sheets and the other side in overhanging relationship with respect to the flat edge portions. A rotating roller die is provided for engagement with the overhanging portion of the joint blank, and the roller die is gradually displaced for deforming the overhanging portion for molding this portion into engagement with the flat edge portions of the sheets.

---

This application is a division of application Ser. No. 816,143, filed Mar. 10, 1969, now Pat. No. 3,578,519, which in turn is a continuation-in-part of co-pending application Ser. No. 503,842, filed Oct. 23, 1965, now abandoned.

This invention relates to the joinder of edges of sheet material in the formation of closures and containers and the like and it relates more particularly to a method and apparatus for the joinder of edge portions of sheet material in sealing relationship.

The invention is applicable to sheet material of the type formed of metals and alloys of metals, plastic sheet stock, paper, paper board, laminates and the like, and to closures formed thereof and for joinder of the edges of such sheet material in sealing relationship with a material which is as fusible as any of the materials making up the sheets to be formed.

The invention is addressed particularly to the fabrication of containers of such sheet materials and for the attachment of closures in sealing relationship thereon, but it is not limited to same.

To the present sheet materials of the type described have been joined to form closures and containers by molding a joint of plastic material thereon. Such procedures have found a number of objections including:

(1) The high cost of machinery and equipment for injection of plastic material on and about the edges of the sheet to form the joint;

(2) The necessity to maintain cleanliness in the mold in which the container and sheet materials are introduced;

(3) The necessity to maintain a high degree of purity between the container and the closure before and during the molding operation;

(4) The necessity to control the flow of plastic material and to confine the flow to the edges in order to avoid deformation of the sheet material responsive to the lateral thrust of the plastic;

(5) The difficulty of obtaining a good sealed relationship between the plastic sealing material and the sheets especially when such sheets are formed of metallic or ceramic material;

(6) The necessity for maximizing the area of contact between the plastic joint and the surfaces of the sheet material as related to the limited area of contact available when the joint is molded thereon; and (7) The displacement of the sheets during operation and in response to the pressure of the molding material whereby one sheet may become offset from the other for exposure about its edges.

It is an object of this invention to provide a method and means for effecting a sealing joint between the meeting edge portions of sheet material in forming a closure on a container and the like in which a strong pressure seal is obtained; which is capable of maintaining a tight sealing relationship between the edges of the sheets; in which a desired degree of cleainliness and sanitation can be continously maintained during operation to assemble the sheets, and which is simple and easy to effect in a simple and efficient manner without distortion or displacement of the elements making up the closure or container.

These and other objects and advantages of this invention will hereinafter appear and for purposes of illustration, but not of limitation, embodiments of the invention are illustrated in the accompanying drawings, in which:

FIG. 19 is an illustration of apparatus for assembling the joint blank of FIGS. 4-6 to a pair of assembled sheets;

FIG. 20 is an illustration of apparatus for assembling the joint blank of FIG. 9 to a pair of assembled sheets; and FIG. 21 is an illustration of apparatus for assembling the joint blank of FIG. 10 to a pair of assembled sheets.

Figure 1:
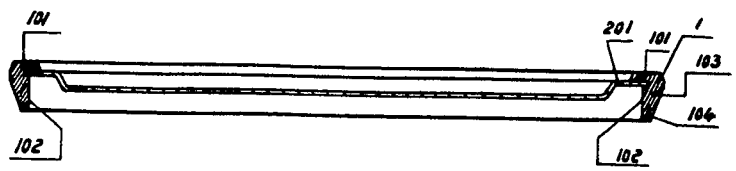
FIG. 1 is an elevational view partially in section of a closure member with a joint blank fixed in position of use on the edge thereof.

In accordance with the practice of this invention, there is provided a joint blank formed of a thermoplastic material having a pair of adjacent sides extending substantially perpendicular one from the other with at least one of the sides, and preferably both of the sides, being flat or rectilinear and with the blank being formed to a shape adapted to fit or to be fitted about the edges of the sheets in their assembled relationship with the flat side fixed to one side of the margins of the assembled sheets. Thereafter, the blank of thermoplastic material is heated and concurrently engaged along its outer walls to effect flow and deformation of the material to bring the other side opposite the side of the marginal edges of the sheet and into sealing engagement therewith.

When one of the sheets to be assembled is made up of a thermoplastic material which is substantially the same as that of the joint blank, the joint blank may be formed as an integral part of the sheet or otherwise joined to the edges thereof to be assembled.

The practice of the invention makes use of special equipment arranged for effecting the desired assembly of sheets in sealing engagement including (1) means for positioning the joint blank with a flat side in engagement with one side of the margins of the assembled sheets; (2) a means in the form of dies or rollers which operate to engage the joint blank for stabilization and for deformation of the lateral portions of the blank onto the margins of the sheets to be assembled; and (3) a means for actuation to effect rotational movement between the roller means and the assembly formed of the sheets and joint blank in position of use whereby the desired deformation of the blank to effect sealing engagement with the edges of the sheets can be effected.

In a preferred arrangement wherein the sheets to be assembled are circular in shape, as in closures and containers of cylindrical shape, use is preferably made of a roller die in which the arrangement comprises (1) means for positioning a flat side of the joint blank onto one side of the margins of the assembled sheets; (2) a roller die which is mounted for rotational movement about a first axis which is in the same plane as a second axis of the circular edges of the circular sheets; (3) means for rotation of the roller assembly about a third axis which is perpendicular to the plane of the first and second axes for rocking movement of the roller in the direction into and out of engagement with the portion of the joint blank disposed outwardly of the second side, and (4) means for effecting rotational movement of the sheets and the rollers about their respective second and first axes respectively and for effecting rocking movement of the roller assembly about its third axis to bring the roller die into operative engagement with the joint blank thereby to cause the temperature of the thermoplastic material to be raised while continuation of movement of the roller assembly about its third axis in the direction toward the third joint effects deformation of the blank in a manner to bring the portions of the material making up the second side into sealing engagement with the other side of the margins of the assembled sheets to effect a sealed joint therebetween.

Figure 2:
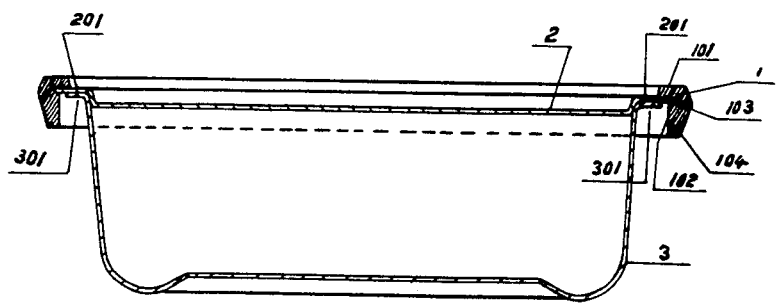
FIG. 2 is an elevational view similar tothat of FIG. 1 with the addition of the container in position for joinder.
Figure 3:
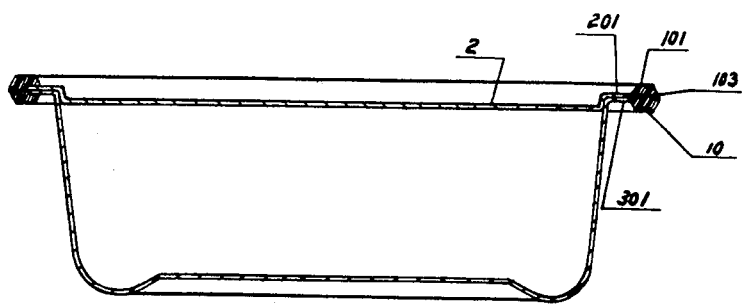
FIG. 3 is an elevational view similar to that of FIGS. 1 and 2 showing the elements of FIG. 2 in their assembled relationship to form the sealed enclosure.

Having described the general concepts of this invention, reference will now be made to the showing in FIGS. 1-3 for a more detailed description of the assembly of two sheets hereinafter identified by the numerals 2 and 3 in which sheet 2 may represent the closure disc and sheet 3 a container having a flat rim formed on the upper edge thereof.

The sheets 2 and 3 are assembled at their flat rims indicated respectively at 201 and 301. For this purpose, there is employed a prefabricated blank of a thermoplastic resinous material having a first flat rectilinear side 101 and a second rectilinear side 102 which sides extend one from the other at approximately right angles and preferably at a very slight obtuse angle. The blank is of a shape such that it can be applied to the rim or flange of the overlapping sheets 2 and 3 to be joined.

In the example represented by the figures, the blank 1 is slightly notched at 103 so as to facilitate the positioning of the first sheet 2 on which the blank is initially fixed, as shown in FIG. 1. The second sheet 3, which is in the form of a flange on the upper edge of a container, is then placed in position in abutting relationship with the underside of the marginal edge portion of the sheet 2, as shown in FIG. 3. The blank, or at least its lateral portion 104, disposed outwardly of the side 102, is heated and it is collapsed onto the underside of the sheets by application of pressure onto the latter portion so that the two sheets are clamped as in a jaw between the surfaces produced respectively by the sides 101 and 102, as shown in FIG. 3. The blank is thus deformed about the marginal portions of the sheet to provide a joint 10 which secures the edges of the sheets in sealing relation.

The means for pressing down the lateral portion 104 of the blank may be formed, for example, by a die means adapted slidably to engage the lateral portion of the blank while turning about an axis so as to press down said portion in a manner to effect its deformation onto the ends of the sheets to be assembled, or by means of rollers which fulfill the same purpose. The heating of the joint blank can be achieved either by the supply of external heat or by heat generated in response to friction between the dies or rollers and the lateral portions of the blank.

Figure 6:
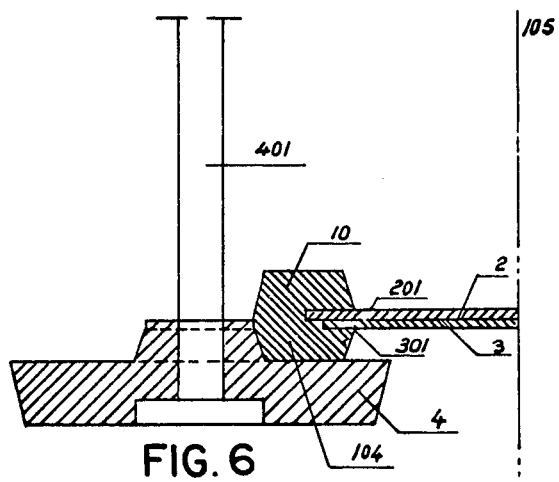
FIG. 6 is a sectional view similar to that of FIGS. 4 and 5 showing the arrangement of elements upon completion of the process for effecting the sealed enclosure.
Figure 5:
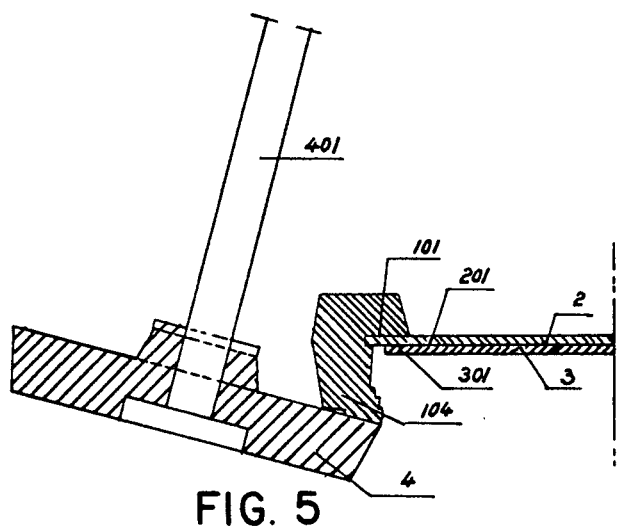
FIG. 5 is a sectional elevational view similar to that of FIG. 4 showing the elements during an intermediate portion of the process for effecting the sealed enclosure.
Figure 4:
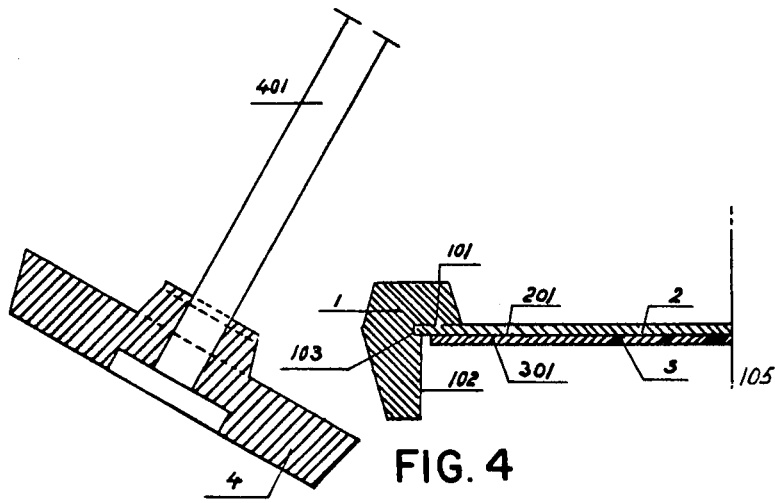
FIG. 4 is a sectional elevational view showing the position of the elements at the start of the process for effecting the sealed enclosure.

When the edge or outline of the sheets to be assembled is circular, it is possible to make use of a very simple and inexpensive piece of equipment having a high production capacity. One such arrangement is illustrated in FIGS. 4-6 of the drawings.

The two sheets 2 and 3, which may be of any desired shape, are formed with flat margins on flanges 201 and 301 which are arranged in abutting relationship one on the other in the position to be united.

Use is made of a joint blank 1 of the type previously described having the first side 101 in the form of a flat surface. The sheet 2 is placed in position, as previously described, with the optional notch or recess 103 insuring a suitable positioning during the assembly and molding operation. The second sheet is placed in position, also as previously described.

The assembly for installation comprises essentially a roller 4 which is mounted for rotational movement about its own axis, hereinafter identified as the first axis 401. There may be several such rollers distributed preferably about the edges of the sheets to be assembled. A second axis 105 corresponds to the axis formed by the centers of the circles at the peripheries of the sheets 2 and 3 and the first and second axes are adapted to lie in the same plane. The blank 1 represents a surface of revolution about the second axis. The roller is mounted for rotational movement about a third axis 402 which is perpendicular to the plate formed by the first and second axes so that when the roller assembly is rocked about this third axis in the direction toward the blank, the roller is adapted operatively to engage the portion 104 of the blank 1 disposed outwardly of the side 102.

By rotation of one or both including the roller and/or the sheet and blank, for relative movement therebetween about their respective axes 401 and 105, and by rocking movement of the roller assembly about its third axis 402, in the direction toward the blank, the roller comes into engagement with the blank along its outer portion 104. The friction produced in response to relative movement between the roller and blank operates to increase the temperature of the material of which the blank is formed. Continued movement of the roller assembly about the third axis 402 will enable the roller to press upon the portion 104 of the blank to cause deformation thereof about the edges of the sheets in effecting a sealed joint as shown in FIG. 6.

Figure 8:
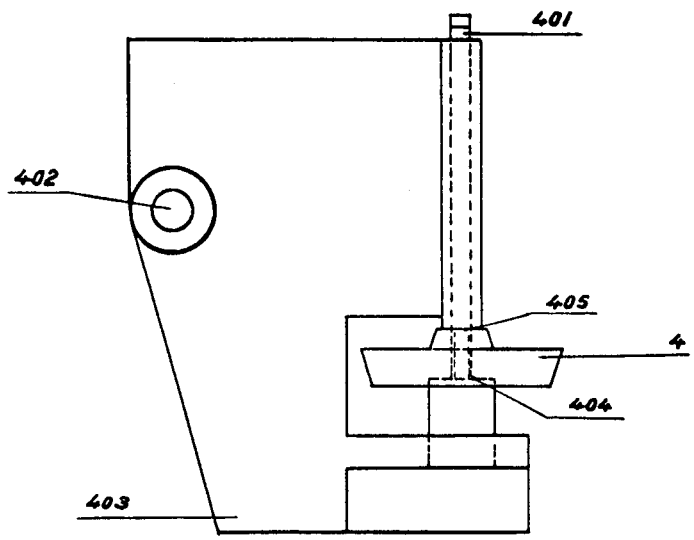
FIG. 8 is a front elevational view of the roller assembly shown in FIG. 7.
Figure 7:
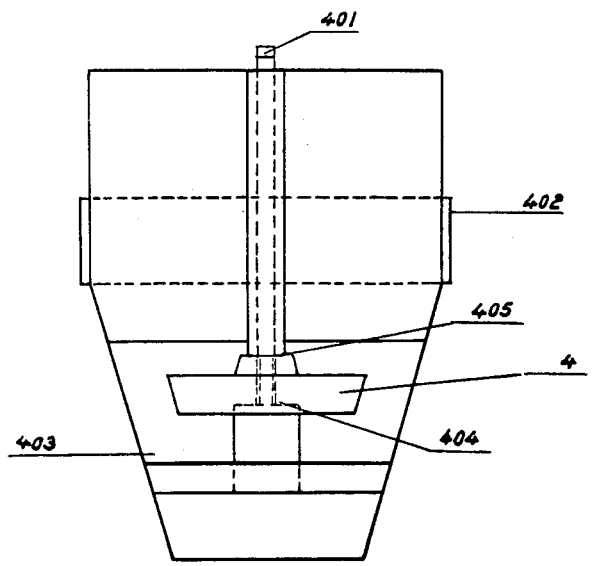
FIG. 7 is a side elevational view of the roller assembly shown in FIGS. 4–6 and its support.

As indicated in FIGS. 7 and 8, the roller support is formed of a frame plate 403 which is mounted for rotational movement about a pivot 402. The roller 4 is mounted in the frame for rotational movement about its axis 401 by a ball type thrust bearing 404 on one side and by a roller bearing 405 on the other side. In operation, the lower sheet 3, which may be a part of a container, is positioned in a support while the upper sheet 2, which may form a bottom or a cover for the container, is held with the joint blank 1 by a cap (not shown) which may be fixed to the support.

Figure 9:
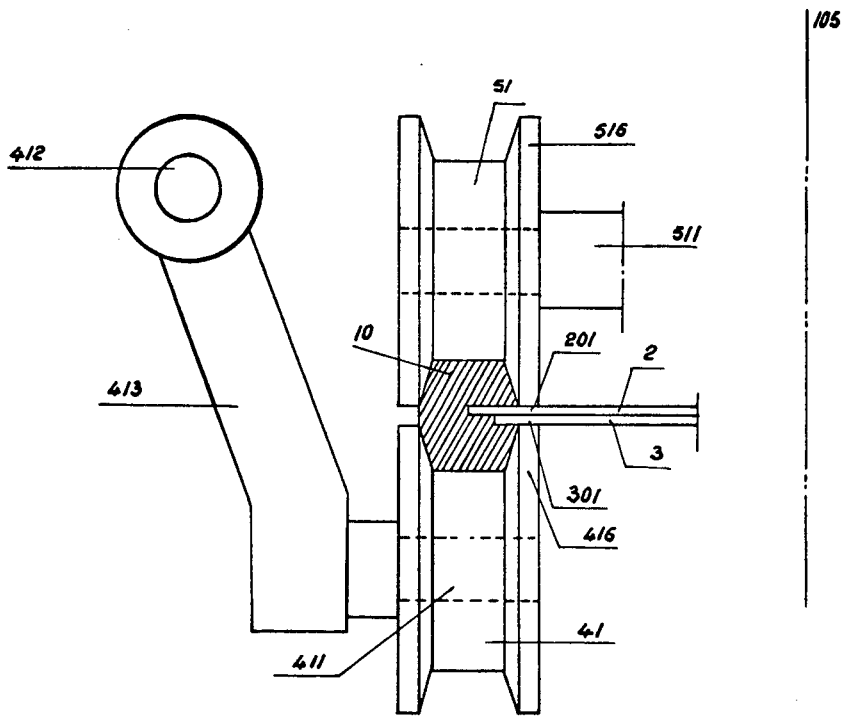
FIG. 9 is an elevational view partially in section of a modification in the roller assembly.

Numerous constructions are possible as represented by the following:

FIG. 9 represents a grooved roller 41 mounted for rotational movement about its shaft 411 which is secured to a frame arm 413 which in turn is mounted for rocking movement about a pivot 412. The roller may be heated, either by means of electrical resistance heaters or by induction heaters or simply by the friction generated between the roller and the thermoplastic joint.

The elements to be assembled are held in position by a die which is represented in FIG. 9 as a second roller 51 mounted for rotational movement on its shaft 511. The inner sides 416 and 516 of the two rollers are adapted to engage the opposite sides of the flat rims 201 and 301 respectively therebetween to block the flow of material and to insure a strong final pressure which operates to improve the tightness of the seal.

Figure 10:
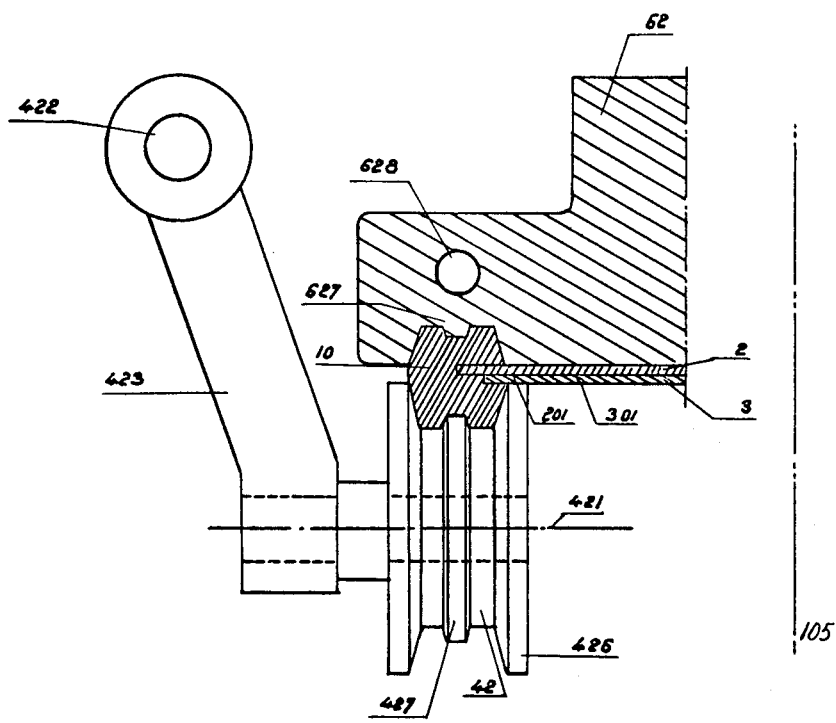
FIG. 10 is an elevational view partially in section of a still further modification in a roller assembly which may be employed in the practice of this invention.

In another modification, shown in FIG. 10, the grooved roller 42 is mounted for turning movement about a shaft 421 on the arm 423 and in which the arm 423 is mounted for swinging movement about the pivot 422. The roller is formed with a central annular rib 427 designed to guide the joint during the period when it is under deforming pressure. The means by which the elements to be assembled are maintained in position comprises a fixed die member 62 which is also provided with a ledge 627 coinciding with the rib 427. The die part is also provided with a passage for the circulation of fluid therethrough for temperature control. The roller can be heated either by means of an electrical resistance or by induction heating or by friction. The rims 201 and 301 of the sheets 2 and 3 are tightly clamped, upon completion of the operation, between the side 426 of the roller and the lower face of the die member 62.

It will be seen from the drawings that the sheet 2, which is brought into contact with the flat surface formed by the first rectilinear or flat side 101 of the blank 1, is represented as having a larger diameter than that of sheet 3 to provide a portion which extends for a short distance beyond the edge of the latter. This is merely a convenience in connection with the existence of a recess 103, when formed in the blank, but such overlap is not otherwise necessary.

Figure 11:
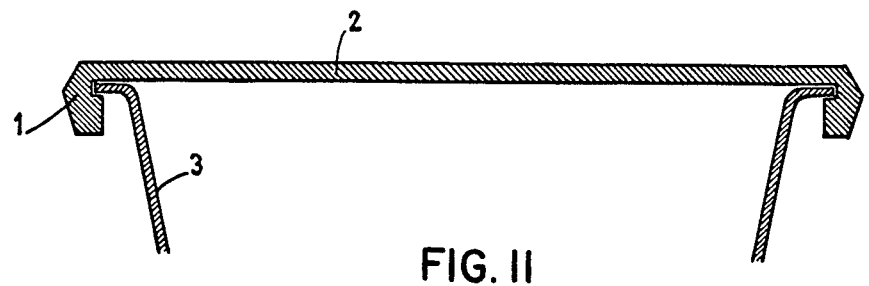
FIG. 11 is a sectional elevational view of a modification wherein the closure is formed of a thermoplastic sheet having the joint blank fixed thereto as a part thereof.

When one of the sheets to be assembled is formed of the same thermoplastic material as the joint, the joint may be formed as an integral part thereof to be manufactured at the same time, as illustrated in FIG. 11.

The rims of the sheets to be assembled and the joint blank can be formed with various configurations for purposes of increasing the tightness and sealing relationship of the connection.

Figure 12:
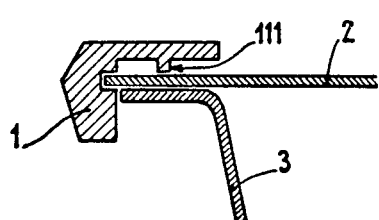
FIG. 12 is a sectional elevational view of the arrangement of elements in relative position for joinder with an intermediate groove.
Figure 13:
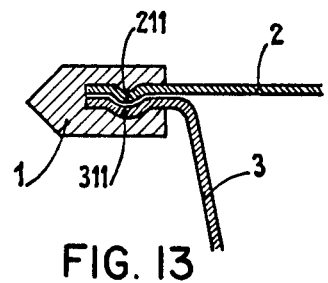
FIG. 13 is a sectional elevational view of elements shown in FIG. 11 in their assembled relationship.

As illustrated in FIGS. 12 and 13, the joint may be formed with at least one rib 111 designed to form an impression in the rims of the sheets and which forms interlocking ribs 211 and 311 in the sheets of the final molded assembly.

Figure 14:
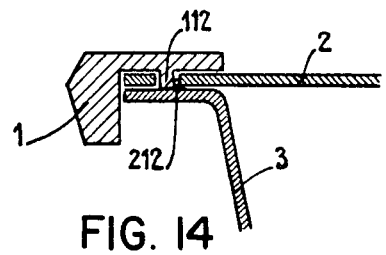
FIG. 14 is a sectional elevational view of the arrangement of elements in relative position for joinder in a modified joint.
Figure 15:
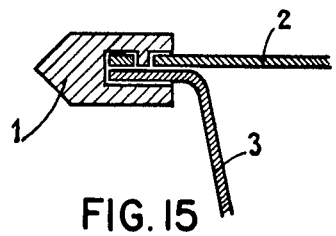
FIG. 15 is a sectional elevational view of elements shown in FIG. 14 in their assembled relation.

As illustrated in FIG. 14, one of the sheets 2 or 3 may be formed with spaced openings 212 about the edge portion for recipt of protuberances 112 molded into the preformed blank properly to locate the blank on the assembly. In the molding operation, the openings 212 will become completely filled with the material making up the protuberances 112 to enhance the assembled and sealed relationship. The protuberances in the preformed joint are not essential since the material making up the joint is capable of flow sufficiently to penetrate into the openings to establish a gripping relationship therebetween.

Figure 16:
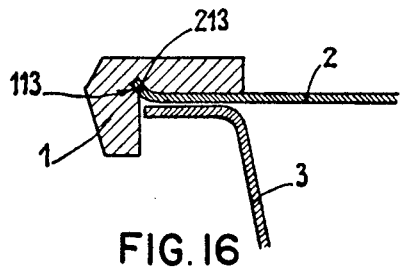
FIG. 16 is a sectional elevational view of a further modification in the arrangement of elements for fabrication of a sealed joint in accordance with the practice of this invention.

As shown in FIG. 16, the sheet 2 may have its outer edge turned upwardly or beaded, as at 213, and the joint blank will be performed with a corresponding recess 113 capable of receiving the upturned edge portions.

Figure 17:
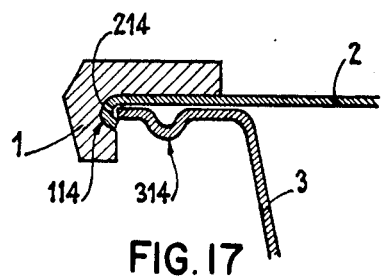
FIG. 17 is a sectional elevational view of the arrangement of elements in relative position for producing a joint with a beaded rim.
Figure 18:
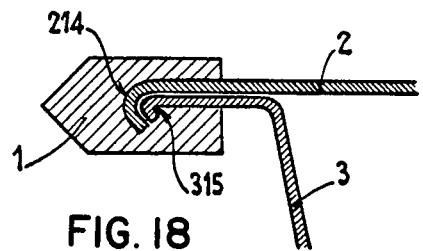
FIG. 18 is a sectional elevational view of the elements shown in FIG. 17 in their assembled relationship.

Further, as shown in FIGS. 17 and 18, it is possible to take advantage of the pressure exerted on the joints during the sealing operation to effect deformation of the sheet 3 so as to form a beaded edge thereon. The sheet 2 will be provided with a downturned or beaded edge 214 adapted to fit into a corresponding recess 114 formed in the blank 1. The sheet 3 is formed with a rib 314 spaced inwardly a short distance from its outer edge. During the clamping operation, the rib 314 becomes flattened whereby the metal is adapted to slide outwardly toward the beaded edge 214 of the sheet 2 which forms the material into an identical beaded edge 315 on the edge of the sheet 3 to provide an exceptionally tight and rigid joint therebetween.

Referring now to FIG. 19, there is illustrated apparatus for effecting the sealing of a joint blank 1 to a pair of assembled sheets. As pointed out above in connection with the description of FIG. 2, one of the assembled sheets may be constituted by a container 3 having a flat rim formed on the upper edge thereof. The apparatus comprises a support 430 from which extends a housing 431. A shaft 432 passive through the housing 431 is connected through a belt and pulley arrangement 433 to a motor 434 secured by any suitable means as shown at 435 to the housing 431. The lower end of the shaft 432 is held by a suitable threaded connection 436 to the member 430 so that when the motor 434 is energized, the member 430 will be caused to rotate.

Provided on the underside of the member 430 is a raised portion 437 providing a socket into which the joint blank 1 may be seated. A base support 438 is provided on which the container 3 may be raised and is vertically adjustable by means not shown, but connected to a shaft 439 to bring the container together with the joint blank and the lid 2 into engagement with the raised portion 437. The shaft 401 carrying the roller 4 is mounted in the frame plate 403 which has provided at its upper end a flat portion 440 extending out of the plane of the figure and carrying a motor means 441 secured thereto. Also extending from the flat portion 440 above the pivot 402 is an arm 442 having an opening 443 provided therein for receiving the end of a piston rod 444. The piston rod 444 is movable in a cylinder 445 which is anchored at one end by a pivot 446 to the member 445. Any suitable fluid may be connected to the cylinder 445 to provide for reciprocating movement of the piston 444 therein.

When it is desired to seal the joint blank 1 to a sheet or cover 2 on a container 3, the joint blank, cover and sheet are assembled and placed on the support 438. These elements in their assembled form are illustrated in FIG. 2. The support 438 is caused to move into engagement with the raised portion 437 on the underside of the element 430. The motor means 430 and 441 may then be actuated and in response to such actuation the member 430 and roller 4 will be caused to rotate. Fluid is then admitted to the cylinder 445 causing the piston rod 444 to extend and consequently the frame plate 403 to rotate counterclockwise about the pivot 402. This brings the roller 4 into engagement with the blank along its outer portion 104, as shown in FIG. 5. It is pointed out in connection with the description of that figure and FIG. 6 the friction produced in response to the relevant movement between the roller and the blank operates to increase the temperature of the material of which the blank is formed. Further movement of the roller about the axis 402 enables the roller to press upon the portion 104 to cause deformation thereof about the edges of the sheets and effect a sealed joint as shown in FIG. 6. The rotation of the member 430 causes the entire periphery of the joint blank 1 to be engaged by the roller 4 to create a seal entirely around that periphery.

The roller may be heated either by external means such as electrical resistance heaters or by induction heaters or the heat may be supplied simply by the friction generated between the roller and the thermoplastic joint. Alternatively, heat may be supplied by a resistance heater or otherwise adjacent the raised portion 437 in order to permit the thermoplastic material to flow.

A joint blank of the type shown in FIG. 9 may be sealed around its entire periphery by the use of substantially similar apparatus, as shown in FIG. 20. In this case either the shaft 411 carrying the roller 41 or the shaft 511 carrying the roller 51 may be connected to a suitable motor means in order to effect rotation of the corresponding roller. Although this figure illustrates the sheets 2 and 3 as flat sheets, they, of course, may be constituted by a lid and container similar to that shown in FIG. 19 and be supported against the underside of a comparable member 430. The operation of this embodiment is the same as that described above it being understood, of course, that the position of the roller 41 is illustrated in a position where it has completely shaped the joint blank 10 for in the actual operation of the device it moves gradually to that position as the thermoplastic material flows as a consequence of the applied heat due to friction or otherwise to assume the configuration shown.

FIG. 21 illustrates similar apparatus for completing the seal of a joint blank 10 in which there is a groove provided. The fixed die 62 is supported on a member 430, as shown in FIG. 19, and a motor means 432 is provided on the end of the shaft 421 to cause rotation of the roller 42. The fixed die 62 may be heated by any suitable means to shape the upper portion of the joint blank 10 to the configuration shown. As before, the roller 42 may be heated and in FIG. 21 is illustrated in its final position after flow of the thermoplastic material has been completed.

It will be apparent from the foregoing description that the concepts of this invention can be applied particularly satisfactorily to the formation and closure of containers. An interesting application consists in the closing of sheet metal preserve cans made of the same or different metals or alloys, such as tin plate, aluminum, alloys of aluminum and the like. It is applicable also to containers made of treated or untreated cardboard, plastic sheet material or plastic treated papers and the like.

It will be understood that changes may be made in the details of construction, arrangement and operation without departing from the spirit of the invention, especially as defined in the following claims.

I claim:

1. Apparatus for the joinder of flat edge portions of sheets in sealing relationship with a joint blank of thermoplastic material which is molded about said edges under heat and pressure and in which the joint blank is originally formed with adjacent first and second flat sides extending substantially perpendicularly one from the other comprising: die means for holding the joint blank with one flat side on one side of the flat edge portions of the sheets with the second flat side overhanging the edges of the flat edge portions of the sheets to extend beyond the opposite sides thereof; roller die means mounted for rotational movement about its own first axis and shiftable along an arc having its axis perpendicular to the first axis for rocking movement of the roller die means in the direction toward and away from the overhanging portion of the joint blank; actuation means for displacement of the roller die means into engagement with the overhanging portion of the joint blank for deforming same onto the opposite side of the flat edges of the sheets; means for heating the thermoplastic material during said deforming; and means for rotating said die means and means for rotating said roller die means to effect relative movement between the roller die and the joint blank on the edges of the sheets during engagement between the roller die and the joint blank at the same time that the roller die means is urged into engagement with the joint blank.

2. Apparatus as claimed in claim 1 in which the flat edge portions of the sheets define a circle and in which the axis of the circle lies in a plane perpendicular to the face of the sheets being joined.

3. An apparatus in accordanae with claim 1 wherein the heating is provided through frictional engagement of the roller die with the joint blank.

4. Apparatus as claimed in claim 1 in which the roller die means is a grooved roller.

5. Apparatus as claimed in claim 1 in which the means for holding the joint blank with the first flat side on the one side of the flat edge portions of the sheets constitutes a roller and in which the edges of the roller and the edges of the roller die means operatively engage the opposite sides of the sheets upon completing the sealing operation.

6. Apparatus as claimed in claim 5 in which the die means comprises a second grooved roller arranged to be in vertical alignment with the first roller die means on opposite sides of the flat edges of the sheets upon completion of the sealing operation.

7. Apparatus as claimed in claim 1 in which a flat side of the joint blank has at least one rib spaced inwardly a short distance from the edge which forms an impression in the edges of the sheets in their sealing relation.

8. Apparatus as claimed in claim 1 in which at least one of the flattened edges of the sheets has openings spaced a short distance from the edge and one from the other and in which the one side of the joint blank has protuberances positioned to correspond to the openings for receipt therein.

9. Apparatus as claimed in claim 1 in which the joint blank has a curvilinear recess in the corner portion between the flat sides and in which one of the sheets is formed at its edge with a curvilinear end portion dimensioned to be received in fitting relationship within said recess.

10. Apparatus as claimed in claim 1 in which the joint blank has a curvilinear recess in the corner portion between the flat sides and in which one of said flat edge portions of said sheets is formed at its edge with a curvilinear end dimensioned to be received in fitting relationship within said recess and another sheet has a corrugation spaced inwardly a short distance from the edge which is deformed during the sealing operation to displace material to form a curvilinear end cradled within the curvilinear end portion of the first sheet to define a bead therebetween.

References Cited
UNITED STATES PATENTS

| | | | |
|---|---|---|---|
| 2,985,954 | 5/1961 | Jones et al. | 156—73 |
| 843,845 | 2/1907 | Reed | 156—69 |
| 1,346,877 | 7/1920 | Burroughs | 156—69 |
| 1,393,016 | 10/1921 | Hanmer | 53—340 |
| 1,452,410 | 4/1923 | Boucher | 53—340 |
| 2,152,571 | 3/1939 | Schmidt | 53—340 |
| 2,409,789 | 10/1946 | Osborne | 53—42 |
| 2,556,008 | 6/1951 | Spalding | 156—582 |
| 2,646,183 | 7/1953 | Pellett | 156—69 |
| 2,933,873 | 4/1960 | Swanson | 53—334 |
| 3,402,873 | 9/1968 | Lauterbach, Jr. | 156—69 |
| 3,442,732 | 5/1969 | Stensaker et al. | 156—73 |

BENJAMIN A. BORCHELT, Primary Examiner

H. J. TUDOR, Assistant Examiner

U.S. Cl. X.R.

53—334; 113—24; 156—219